United States Patent [19]
Carbonelli

[11] Patent Number: 5,884,586
[45] Date of Patent: Mar. 23, 1999

[54] INTERCHANGEABLE CAT HOUSE

[76] Inventor: Antonio F. Carbonelli, 81 NW. 48th Ct., Fort Lauderdale, Fla. 33309

[21] Appl. No.: 853,351

[22] Filed: May 8, 1997

[51] Int. Cl.$^6$ ..................................................... A01K 1/03
[52] U.S. Cl. ............................................ 119/485; 119/706
[58] Field of Search ..................... 119/485, 706, 119/708

[56] References Cited

U.S. PATENT DOCUMENTS

| | | | |
|---|---|---|---|
| 3,595,209 | 7/1971 | Parker | 119/706 |
| 4,047,502 | 9/1977 | Gordon, Jr. | 119/706 X |
| 4,367,695 | 1/1983 | Lance | 119/485 |
| 5,577,466 | 11/1996 | Luxford | 119/485 X |

*Primary Examiner*—Robert P. Swiatek

[57] ABSTRACT

A combination interchangeable cat house and scratch post and includes an interchangeable housing member which is preferably removably attached to a platform which is supported by a base and at least one post member. The housing member is preferably removably attached to the platform member by conventional devices such as clamps. A step member is removably attached to the post member. The step member preferably includes a sitting portion which is associated with a support portion. Preferably, carpet is provided around the post member and base member to allow such to act as a scratch post for the cat. Cat toys, such as catnip, can be hung from the platform member or housing member by conventional devices to utilize the step member as a play area for the cat. A second post member and coupling member can be provided to allow the vertical height of the interchangeable cat house to set to either one of two positions.

18 Claims, 2 Drawing Sheets

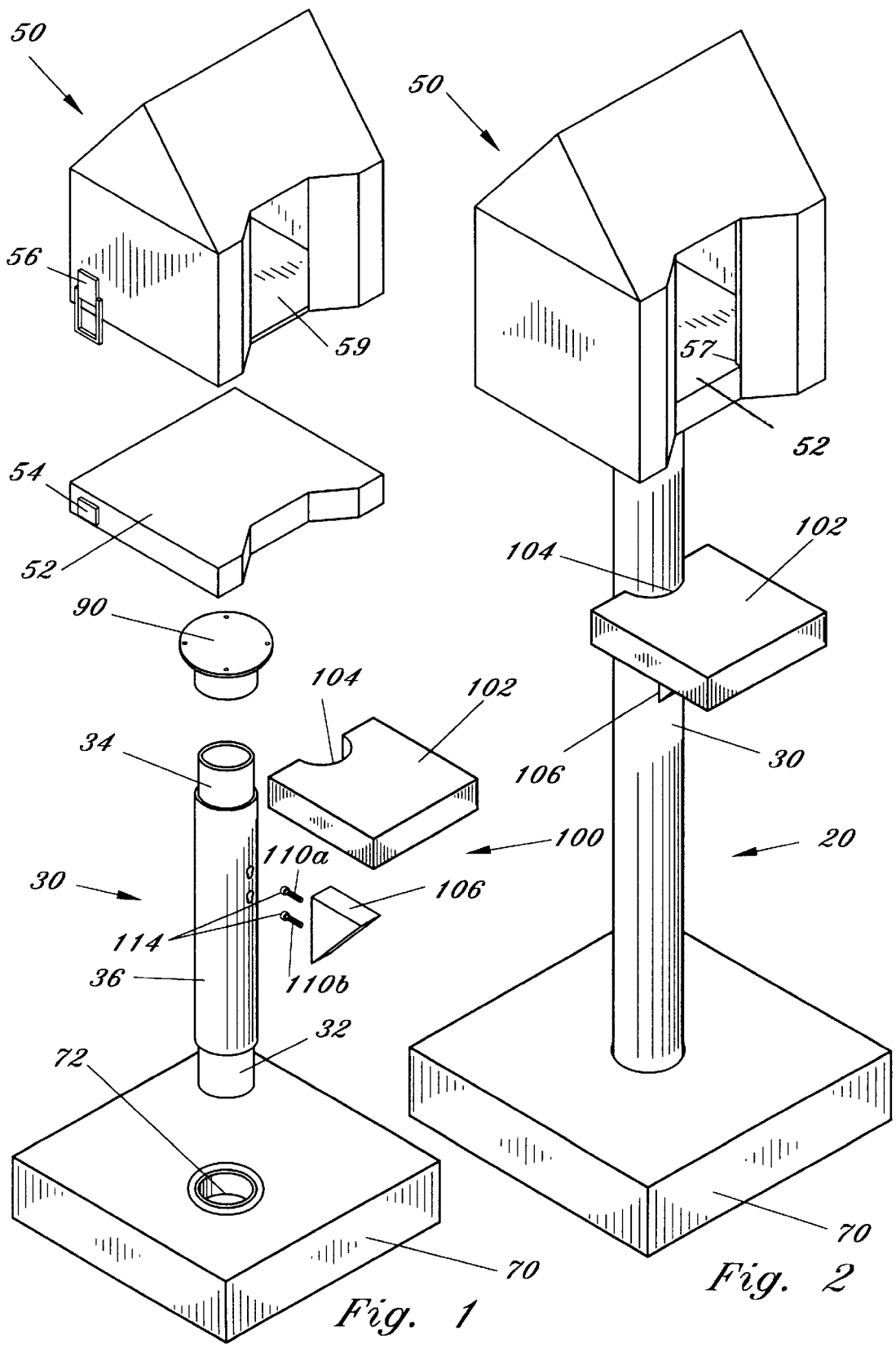

INTERCHANGEABLE CAT HOUSE

BACKGROUND OF THE INVENTION

1. Field of the Invention

The present invention relates to houses or shelters for animals, and particularly to a combination interchangeable cat house and scratch post.

2. Description of the Background Art

Various devices for animals, such as cats, can currently be purchased from pet stores or other retail stores having animal sections. With respect to cats, a separate cat house, separate scratch post and separate food tray are normally purchased.

Typical cat houses currently available are flimsy and not interchangeable and often are constructed from relatively thin cardboard.

As the individual items are separate, a relatively large amount of space in the house or apartment is dedicated to cat items. Additionally, conventional cat houses, normally being free standing structures, are not interchangeable. Thus, if the cat owner changes the decor of the room in which the cat house is disposed, the design and aesthetic features of the cat house may no longer match the new decor.

Thus, what is needed in the art is a combination interchangeable cat house which also provides a scratch post and play area for a cat. Furthermore, the device can also include an area for cat food and water. It is therefore to the effective resolution of the foregoing problems in the prior art that the present invention is directed.

SUMMARY OF THE INVENTION

The present invention provides an interchangeable cat house which includes a scratch post and may also include a play area and food area for the cat. The interchangeable cat house includes a housing member which is preferably removably attached to a platform which is supported by a base and at least one post member. The bottom surface of the base member may be provided with wheels, casters, or rollers in order to make the interchangeable cat house transportable.

A first post member is provided that is slightly narrow in diameter at each end as compared to the middle section of the post member. The first narrow end is disposed within an aperture of the base member for positioning the post member upright. Attached to the bottom of the platform is a flange member which mates with the second narrow end of the post member. The house is then removably attached to the platform member by conventional means such as clamps, though other attaching devices are considered within the scope of the present invention.

As the house is removable, it can be replaced with various styles, including gazebos, spaceships, or any other design, as desired by the user. A portion of the middle section of the post member is preferably provided with two apertures. Each aperture is wider at a top section and narrow at a bottom section. When disposing the post in the base member, the post should be disposed such that the narrow portion of the apertures is below the wider portion.

The apertures are utilized for removably attaching a step member to the post member. The step member preferably includes a sitting portion which is associated with a support portion. Two screws are preferably screwed into the support portion the same distance apart as the distance between the apertures in the post member. A portion of each screw member protrudes out of the support member. To attach the step member to the post member, the screws are inserted at the top portion of each aperture where the aperture is large enough to receive the screw head, and then dropped down such that each screw rests in its corresponding smaller bottom portion of the aperture. In this position, the bottom portion of the aperture is smaller in diameter than the screw head, thus preventing the step from inadvertently being detached from the post member.

In lieu of the screw members, an adjustable metal band can be attached to the step member and tightly disposed around the post member at a vertical position along the post member as desired by the user. Furthermore, the step is not limited to a square configuration and can accommodate any design, as desired. Preferably, carpet is provided around the post member and base member to allow such to act as a scratch post for the cat. Cat toys, such as catnip, can be hung from the platform member or housing member by conventional means to utilize the step member as a play area for the cat.

In another embodiment a second post member and coupling member can be provided to allow the vertical height of the interchangeable cat house to set to either one of two positions. In a first position, one post member is provided and the flange member attached to the bottom of the platform is disposed over the upper narrower end of the first post member to securely removably attach the cat house to the post member. Where a higher vertical height is desired, a second post member and coupling member is provided. The second post member is shaped similar to the first post member described above. The second post member and the first post member are associated with each other by the coupling member. The coupling member is disposed intermediate the post members in order to provide a stable post member, and to prevent the post member from collapsing at the attachment point of the first post member to the second post member. The second post member can also be provided with apertures as discussed above for providing a step member.

Accordingly, it is an object of the present invention to provide a cat house which can be interchangeable to provide various designs for the cat house.

It is another object of the present invention to provide a cat house which can have an adjustable vertical height.

It is still another object of the present invention to provide a combination cat house, cat play area, and cat scratching post.

It is yet another object of the present invention to provide a combination cat house and scratching post which is easily transportable.

It is even still another object of the present invention to provide a combination cat house and scratching post which is relatively sturdy as compared to current cat houses.

In accordance with these and other objects which will become apparent hereinafter, the instant invention will now be described with particular reference to the accompanying drawings.

BRIEF DESCRIPTION OF THE DRAWINGS

FIG. 1 is an exploded view of the present invention having a single post member;

FIG. 2 is a perspective view showing the present invention having a single post member and illustrating an alternative housing attachment as compared to the housing attachment illustrated in FIG. 1;

DESCRIPTION OF THE PREFERRED EMBODIMENTS

Figure 3A:
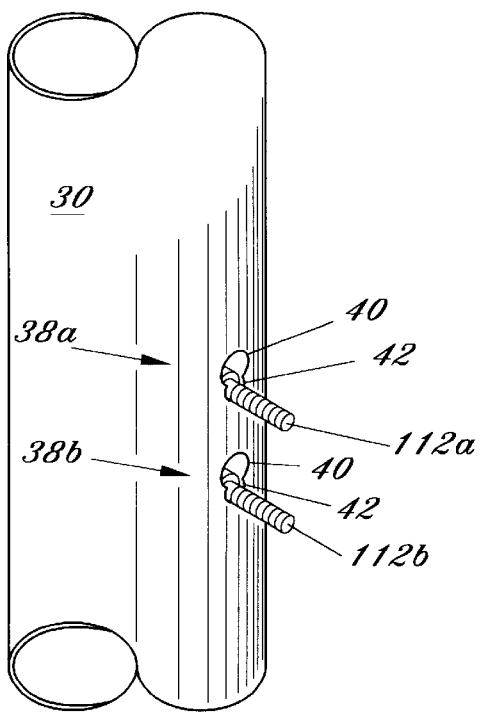
FIGS. 3a and 3b illustrate the position of the screws within the post apertures when attaching the step member to the support member.

As seen in FIGS. 1 and 2, a first embodiment of an interchangeable cathouse is shown and generally designated as reference numeral 20. Cathouse 20 generally includes a scratch post 30, housing member 50 and may also include a play area and food area for the cat. Housing member 50 is removably attached to a platform 52 by conventional means such as clamps or mating members 54 and 56, disposed on platform 52 and housing member 50, respectively. Preferably, four mating members 54 and 56 are provided, where housing member 50 is square or rectangular in shape, at each corner of housing member 50. Though the clamps or other mating devices are approximate the corners of platform 52 and housing member 50, such is not limiting, and it should be understood that the clamps or other mating members or devices can be located anywhere along platform 52 and/or housing member 50. As other shapes are available for housing member 50, the number of mating members 54 and 56, or other attachment devices, will vary, and the present invention should not be considered limited to a specific number of attachment means.

Furthermore, other conventional removable attachment devices such as clips, tapes, velcro, etc., in lieu of mating member 54 and 56, can be provided and are all considered within the scope of the invention.

FIG. 2 also illustrates an alternative housing embodiment. In this embodiment, the base portion 59 (FIG. 1) of housing member 50 is removed, as platform 52 serves as the base portion. Housing member 50 is sized slightly larger than platform 52, to allow platform 52 to be received within housing 50 at the bottom of housing 50. Thus, housing member 50 is removably attached to platform 52.

Preferably, a stop member 57 is provided along at least a portion of the inner walls of housing member 50 and/or at one or more of the inner corners of housing member 50. Stop member 57 properly positions housing member 50 by allowing platform 52 to be received within housing member 50 only a certain distance. When housing member 50 is properly positioned on platform 52, a portion of the top surface of platform 52 abuts at least a portion of the bottom surface of stop member 57. Preferably, in this proper position, the bottom surface of housing member 50 is substantially flushed with the bottom surface of platform. Preferably, platform 52 is snugly received within housing member 50 to provide for a tight and secure, yet removable, attachment between platform 52 and housing member 50.

As a further alternative attachment embodiment, the top surface of platform 52 can be provided with one or more cavities for receipt of one or more corresponding peg members depending downward from the bottom surface of housing member 50. Similarly, the peg members can be protruding upwards from the top surface of platform 52 for receipt within corresponding cavities located in the bottom surface of housing member 50. In this embodiment, the outer size of housing member 50 is preferably corresponding to the outer size of platform 52 to provided for a flush outer surface between housing member 50 and platform 52 when the peg members are received within their corresponding cavities. This further alternative embodiment also provides for a removable attachment between housing member 50 and platform 52 to allow housing member 50 to be with a different designed housing member 50 if so desired, as with the other embodiments.

Housing member 50 can be supported by a base member 70 and post member 30. A bottom surface of base member 70 may be provided with wheels, casters, or rollers (such as wheels 300 in FIG. 5) in order to make interchangeable cat house 20 easily transportable. Conventional wheel locks, such as those found on baby carriages or strollers, can also be provided, to prevent cat house 20 from inadvertently rolling when moving means, such as wheels 300, are provided.

Concrete or other weighty material can be disposed within base member 70 to provide for a more solid foundation for cat house 20 and to prevent cat house 20 from tipping over when a cat jumps onto one of the components of cat house 20.

A first post member 30 is provided that is slightly narrow in diameter at its respective ends 32 and 34 as compared to its middle section 36. Post member 30 can be utilized as a cat scratching post and preferably is covered with carpeting over a substantial portion of its exposed outer surface. First narrow end 32 is disposed within an aperture 72 of base member 70 for positioning the post member 30 upright. Preferably, first narrow end 32 is snugly received within aperture 72 to provide for a secure connection. Alternatively, post member 30 and base member 30 can be constructed integral as one piece.

Attached to the bottom of platform 52 is a flange member 90 which mates with second narrow end 34 of the post member 30. Preferably, second narrow end 34 is snugly received within flange member 90 to provide for a secure connection between post member 30 and platform 52.

Flange member 90 is attached to platform 52 by conventional means, such as adhesives, nails, hook and loop fasteners, etc. Alternatively, flange member 90 can be constructed integral with platform 52. Housing member 50 is removably attached to platform member 52 as described above. As housing member 50 is removable, it can be replaced with various housing styles or designs, including gazebos, spaceships, or any other design, as desired by the user.

Housing member 50 can also be constructed integral with platform 52. In this situation, the entire housing member 50 and platform is removed when replacing with a different design housing member. Furthermore, the different design housing members would also be constructed integral with respective platforms 52, with each platform having its own flange member.

A portion of middle section 36 of post member 30 is provided with one or more apertures and preferably two apertures 38a and 38b. Each aperture 38 is wider at a top section 40 and narrows at a bottom section 42. When disposing post member 30 in its proper upright position, post member 30 should be disposed such that narrow portion 42 of apertures 38 are at the bottom. The apertures are utilized for removably attaching a step member 100 to post member 30. Step member 100 includes a sitting member 102 which is associated with a support member 106. Support member 106 can be removably or permanently attached to sitting member 102 by conventional means. Furthermore, support member 106 and sitting member 102 can be constructed integral to form a one piece step member 100.

Two screws 110a and 110b are screwed into the support member 106 the same distance apart as the distance between apertures 38 in post member 30. A portion of each screw 110 protrudes out of support member 106. To attach step member 100 to post member 30, screws 110 are inserted at top portion 40 of each aperture 38, where aperture 38 is large enough to receive screw head 114. Screws 110 are then dropped such that each screw 110 rests in its corresponding smaller bottom portion 42 of aperture 38. Bottom portion 42 of aperture 38 is smaller in diameter than screw head 114, thus preventing step 100 from inadvertently being detached from post member 30.

Additionally, a notch 104 can be preferably provided in sitting member 102, which receives a portion of post member 30 when properly attaching step member 100 to post member 30. Preferably the shape of notch 104 will correspond to the shape of post member 30.

In lieu of screws 110, an adjustable metal band can be attached to step member 100 and tightly disposed around the post member 30 at a position desired by the user. Furthermore, step member 100 is not limited to a square configuration and can accommodate any design, as desired. Preferably, carpet is provided around at least post member 30 and base member 70 to act as a scratch post for the cat. One or more cat toys, such as catnip, can be hung from platform member 52 or housing member 50 by conventional means, such as rope, cords, string, chain, tape, etc., thus utilize step member 100 as a play area, in addition to a sitting spot, for the cat.

Figure 4:
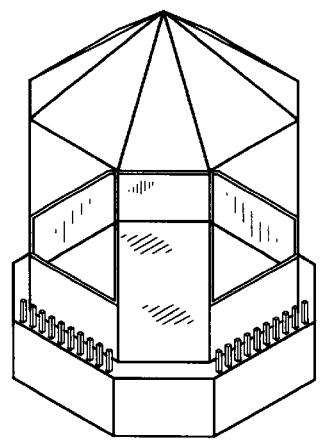
FIG. 4 illustrates an alternative design for the cat house.

FIG. 4 is a gazebo design for housing member 50, which is provided with a conventional attachment member for removably attaching gazebo housing member 50 to platform 52 as described above. The attachment member utilized in FIG. 5 can be any one of the conventional attachment member described for attaching the housing member 50 to platform 52 as illustrated in FIGS. 1 and 2.

Figure 3B:
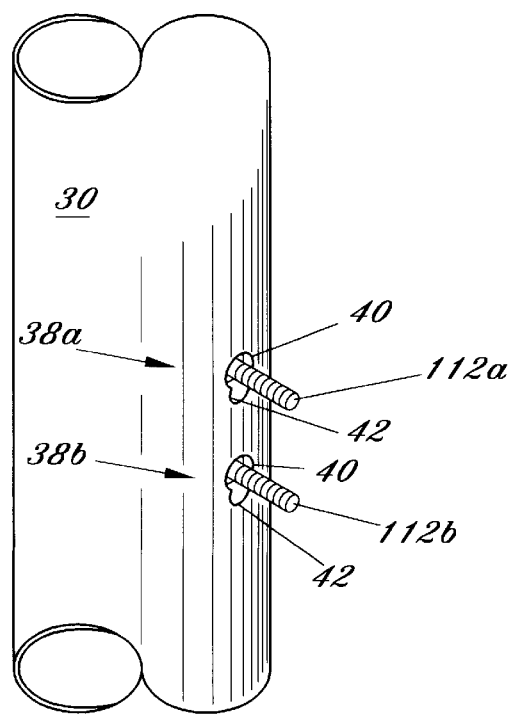
Figure 5:
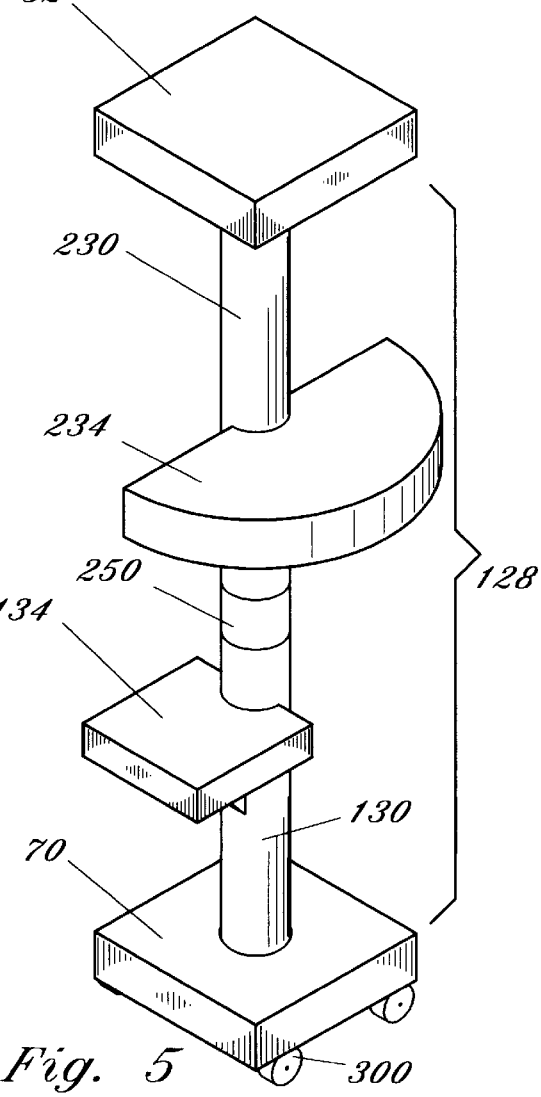
FIG. 5 illustrates a perspective view of an alternative embodiment of the present invention incorporating two post members in accordance with the present invention.

FIG. 5 illustrates an alternative embodiment of the present invention wherein a post member 128 consist of two post portions 130 and 230. In this embodiment, the platform member, base member, step members, and housing members are constructed similar to their corresponding structure illustrated in FIGS. 1 through 3.

First post portion 130 is similar in structure to post member 30 and is also attached similarly to base member 70 as post member 30. Thus, first post portion 130 can be provided with a pair of apertures for attaching step member 134 similar to the attachment of step member 100 to post member 30.

To provide for a higher vertical height for housing member 50, a second post portion 230 is preferably provided. Second post portion 230 is shaped similar to first post portion 130 and thus includes narrower ends as compared to its middle section. An upper end of second post portion 230 is inserted within a flange member associated with platform 52 for attaching second post portion 230 to platform 52. This attachment is similar to the attachment of post member 30 to platform 52 discussed above for the first embodiment of the present invention. A step member 234, similar in structure to step member 134 and 100, can be preferably removably attached to second post portion 230 similar to the attachment of step member 134 to first post portion 130 and/or step member 100 to post member 30.

To attach first post portion 130 to second post portion 230, a coupling member 250 is disposed intermediate first post portion 130 and second post portion 230 in order to provide a stable post member. Coupling 250 includes an open first end and an open second end. When attaching first post portion 130 to second post portion 230, at least a substantial portion of an upper narrow end of said first post portion 130 is received within coupling 250 at coupling 250's first open end and at least a substantial portion of a lower narrow end of said second post portion 230 is received within coupling 250 at coupling 250's second open end. Coupling 250 prevents the post member, and attached platform and housing member, from collapsing and failing, at the attachment point of first post portion 130 to second post portion 230. In this embodiment, a substantial portion of base member 70, first post portion 130, second post portion 230 and/or coupling 250 can be provided with carpeting to provide for the scratching post in accordance with the present invention.

Thus, in the second embodiment of the present invention, the vertical height of the interchangeable cat house can be set to either one of two positions. In a first position, only first post portion 130 is provided and the flange member attached to the bottom of platform 52 is disposed over the upper narrower end of first post portion 130 to securely and removably attach an interchangeable cat house to first post portion 130 (at this height the second embodiment closely resembles the first embodiment of the present invention illustrated in FIGS. 1 through 3). Where a higher vertical height is desired, a second post portion 230 and coupling member 250 are provided, and attached as described above.

In either embodiment, the interchangeable cat house 50 can be removed, thus allowing platform 52 to serve as an additional sitting area where one or more step member are provided or as the primary sitting area where no step members are provided. Furthermore, though it is preferred that one step member be removably attached to each post member or portion, such is not limiting. Thus, it is also within the scope of the invention to attach more then one step member to each post member or portion.

Furthermore, a second housing member not shown, but similar to housing member 50 (but preferably smaller) can be removably attached to one or more of the step members similar to the attachment of housing member 50 to platform 52. The various step members described above can also be provided with designs, including, but not limited to, elaborate circular stairways or ramps.

Food and water trays can also be provided within the housing member, or on top of platform 52 or any of the step members. It is also within the scope of the present invention to provide a liter box either on the step members, platform 52 or within housing member 50.

The various components of interchangeable cat house 20, in either embodiment, can be constructed from a variety of conventional materials, including wood, plastic, aluminum, metal, fiberglass, PVC, etc. or any combination of such conventional materials. In addition to providing carpeting on the post members and base member, carpeting can also be provided over at least a portion of platform 52 and housing member 50.

Food and water trays or other container or compartments can be provided within housing member 50 or disposed on the base member or upon one or more of the step members. Furthermore, the food and water trays can also depended from the platform or post members.

The carpeting, which acts as a scratching member, is attached to the various components by conventional means such as adhesives, staples, screws or nails, tapes, velcro, etc. all of which are considered within the scope of the present invention. In addition to carpeting or in lieu of carpeting, at least one string of rope, which also acts as a scratching member, can be provided on the post members or other components for enjoyment by the cat. Where carpeting is also provided as discussed above, the rope is disposed over the carpet. With or without carpeting, the rope can be attached by conventional means such as staples, tapes, adhesives, etc.

Furthermore, the present invention should not be considered limited to any set of dimensions for the various components of the combination cat house/scratching post 20. Furthermore, the present invention can be provided in a miniature size for use as a toy pet house. As stated above, the housing member is not limited to any one design, and all various designs, shapes, patterns, colors, etc. for the housing member are considered within the scope of the invention.

Though the post members or portions are preferably circular in shape, such is not limiting, and other shapes for the post members are considered within the scope of the invention. Furthermore, the base member is not limited to a square or rectangular shape. Additionally, the post members and/or the base member, can be shaped to resemble a tree stump.

The present invention is preferably utilized as an interchangeable cat house. However, it should be understood that the present invention is not limited to use by cats, and can be utilized as a house for any type of pet or reptile, such as birds, dogs, hamsters, etc. Furthermore, the invention can also be utilized as a decorative piece without functioning as a housing member for a specific animal or reptile.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A combination scratching post and interchangeable pet house, comprising:
   a base member;
   a post member protruding upwards from said base member;
   a platform member attached to an upper end of said post member; and
   a housing member removably attached to said platform member; said platform member including a flange member removably attached to a bottom surface of said platform member which is removably attached to an exposed end of said post member.

2. The combination scratching post and interchangeable pet house of claim 1 further including a step member attached along a portion of said post member.

3. The combination scratching post and interchangeable pet house of claim 1 wherein a substantial portion of said base member and said post member are covered by carpeting.

4. The combination scratching post and interchangeable pet house of claim 1 wherein said post member consists of a first post portion and a second post portion, a first end of said first post portion attached to said base member, a first end of said second post portion attached to said platform, said first post portion and said second post portion attached to each other at respective second ends of said first and second post portions.

5. The combination scratching post and interchangeable pet house of claim 4 further including a first step member attached to said first post portion and a second step member attached to said second post portion.

6. The combination scratching post and interchangeable pet house of claim 1 further including one or more wheel members attached to a bottom surface of said base member.

7. A combination scratching post and interchangeable pet house, comprising:
   a base member;
   a post member protruding upwards from said base member, said post member consisting of a first post portion and a second post portion, a first end of said first post portion attached to said base member, a first end of said second post portion attached to said platform, said first post portion and said second post portion attached to each other at respective second ends of said first and second post portions;
   a platform member attached to an upper end of said post member;
   a housing member removably attached to said platform member; and
   a coupling member having an open first end and an open second end, said second end of said first post portion received within said coupling member at its open first end and said second end of said second post portion received within said coupling member at its open second end when attaching said first post portion to said second post portion.

8. A combination scratching post and interchangeable pet house, comprising:
   a base member;
   a post member protruding upwards from said base member;
   a platform member attached to an upper end of said post member; and
   a housing member removably attached to said platform member;
   wherein a flange member is disposed at a bottom surface of said platform member, wherein an upper end of said post member is inserted within said flange member when attaching said platform member to said post member.

9. The pet house of claim 8 wherein a substantial portion of said post member is covered by a scratching member.

10. The pet house of claim 9 wherein said scratching member is carpeting or rope.

11. A combination scratching post and interchangeable cat house, comprising:
    a base member;
    a post member protruding upwards from said base member, a substantial portion of said post member and said base member covered by carpeting, said post member including a lower end associated with said base member and an upper end;
    a platform member having an upper surface and a lower surface;
    a flange member associated with the lower surface of said platform member, at least a portion of said upper end of said post member received within said flange member for attaching said platform member to said post member;
    a housing member removably attached to said platform member; and
    at least one step member attached to post member.

12. The combination scratching post and interchangeable cat house of claim 11 wherein said post member consist of a first post portion and a second post portion, a first end of said first post portion attached to said base member, a first end of said second post portion attached to said platform, said first post portion and said second post portion attached to each other at respective second ends of said first and second post portions.

13. The combination scratching post and interchangeable cat house of claim 12 further including a coupling member having an open first end and an open second end, said second end of said first post portion received within said coupling member at its open first end and said second end of said second post portion received within said coupling member at its open second end when attaching said first post portion to said second post portion.

14. The combination scratching post and interchangeable cat house of claim 12 wherein a first step member and a second step member are provided, said first step member removably attached to said first post portion and said second step member removably attached to said second post portion.

15. The combination scratching post and interchangeable cat house of claim 11 further including one or more wheel members attached to a bottom surface of said base member.

16. The combination scratching post and interchangeable cat house of claim 11 wherein said at least one step member consist of a sitting portion and a support portion, said support portion having at least one screw protruding outward for insertion within at least one corresponding aperture within said post member for securely attaching said at least one step member to said post member, said sitting portion including a notch shaped dependent on the shape of said post member.

17. The combination scratching post and interchangeable cat house of claim 11 wherein said housing member can be removed and replaced with a different housing member.

18. The combination scratching post and interchangeable cat house of claim 11 wherein one or more cat play items can depend from either said platform or said housing member.

* * * * *